(12) United States Patent
Kiyosawa et al.

(10) Patent No.: US 8,692,906 B2
(45) Date of Patent: Apr. 8, 2014

(54) LUMINANCE SIGNAL GENERATION APPARATUS, LUMINANCE SIGNAL GENERATION METHOD, IMAGE PICKUP APPARATUS, AND STORAGE MEDIUM

(75) Inventors: Kazuyoshi Kiyosawa, Inagi (JP); Eiichiro Ikeda, Yokohama (JP)

(73) Assignee: Canon Kabushiki Kaisha (JP)

( * ) Notice: Subject to any disclaimer, the term of this patent is extended or adjusted under 35 U.S.C. 154(b) by 449 days.

(21) Appl. No.: 13/182,111

(22) Filed: Jul. 13, 2011

(65) Prior Publication Data

US 2012/0013769 A1 Jan. 19, 2012

(30) Foreign Application Priority Data

Jul. 13, 2010 (JP) .................................. 2010-158776

(51) Int. Cl.
*H04N 9/68* (2006.01)
*G06K 9/00* (2006.01)

(52) U.S. Cl.
USPC ..................... 348/234; 348/222.1; 348/229.1; 382/162; 382/167

(58) Field of Classification Search
USPC .................. 348/222.1–225.1, 229.1, 230.1, 348/234–238; 382/162, 167, 260–266
See application file for complete search history.

(56) References Cited

U.S. PATENT DOCUMENTS

| | | | | |
|---|---|---|---|---|
| 8,494,260 | B2 * | 7/2013 | Sawada et al. | 382/162 |
| 2006/0038891 | A1 * | 2/2006 | Okutomi et al. | 348/222.1 |
| 2007/0002154 | A1 * | 1/2007 | Kang et al. | 348/272 |
| 2010/0033600 | A1 * | 2/2010 | Ikeda | 348/234 |
| 2010/0119148 | A1 * | 5/2010 | Adams et al. | 382/167 |
| 2010/0188529 | A1 * | 7/2010 | Tsuruoka | 348/234 |
| 2010/0245636 | A1 * | 9/2010 | Kumar et al. | 348/273 |
| 2011/0211126 | A9 * | 9/2011 | Tsukioka | 348/631 |

FOREIGN PATENT DOCUMENTS

| | | | |
|---|---|---|---|
| JP | 2008-072377 A | 3/2008 | |
| JP | 2009-105977 A | 5/2009 | |

\* cited by examiner

*Primary Examiner* — Twyler Haskins
*Assistant Examiner* — Dwight C Tejano
(74) *Attorney, Agent, or Firm* — Rossi, Kimms & McDowell LLP

(57) ABSTRACT

A luminance signal generation apparatus capable of suppressing an occurrence of aliasing at near horizontal and vertical Nyquist regions in the case of an achromatic object. An OG signal is generated by interpolating a green signal on pixels other than green pixels, and an SWY signal is generated as luminance signals at positions of pixels for respective colors. An angle determination signal is generated according to a direction of an edge of an image signal, and hierarchical image signals having different frequencies are generated from the image signal. Based on results of determination of false color region in the hierarchical image signals, one of the hierarchical image signals is selected. According to an angle determination signal and a chroma signal obtained from the selected hierarchical image signal, the OG signal and the SWY signal are mixed to generate a final luminance signal.

14 Claims, 15 Drawing Sheets

| R | G1 |
|---|----|
| G2 | B |

| Y11 | Y12 | Y13 |
|---|---|---|
| Y21 | Y22 | Y23 |
| Y31 | Y32 | Y33 |

LUMINANCE SIGNAL GENERATION APPARATUS, LUMINANCE SIGNAL GENERATION METHOD, IMAGE PICKUP APPARATUS, AND STORAGE MEDIUM

BACKGROUND OF THE INVENTION

1. Field of the Invention

The present invention relates to a luminance signal generation apparatus, a luminance signal generation method, an image pickup apparatus, and a storage medium. More particularly, the present invention relates to an apparatus and a method for generating a luminance signal from a color signal output from an image pickup device having color filters of Bayer pattern, an image pickup apparatus having the luminance signal generation apparatus, and a storage medium storing a program for executing the luminance signal generation method.

2. Description of the Related Art

To generate a color image by using an image pickup device (such as a CCD image sensor or a CMOS image sensor) capable of detecting an amount of light, light is generally made to pass through color filters and then incident to the image pickup device.

The color filters are various in terms of type of color and in terms of arrangement for color allocation to respective pixels. As the type of color, primary colors (red, green, and blue) or complementary colors (cyan, magenta, and yellow) are widely used. As the color arrangement, a Bayer pattern is widely used.

FIG. 21 shows one unit of a primary color Bayer pattern, in which symbol R represents red, G1 and G2 represent green, and B represents blue. The primary color Bayer pattern has units (one of which is shown in FIG. 21) whose number corresponds to the number of pixels provided in the image pickup device.

Conventionally, as methods for generating a luminance signal from a color signal output from a solid-state image pickup device, there have been known two methods, i.e., out-of-green method and SWY method.

In the out-of-green method, red, green, and blue color signals are processed independently of one another when the luminance signal is generated by using color filters of the primary color Bayer pattern shown in FIG. 21. With the out-of-green method, the luminance is determined mainly from the green signal.

To process the red signal, zero data is inserted into pixels (other than red pixels) of a RAW signal obtained by digitizing the color signal output from the image pickup device. Low-pass filter processing is then performed to limit vertical and horizontal bandwidths. Green and blue signals are processed in the same manner as the red signal, whereby the red, green and blue signals are provided to respective pixels. The luminance signal Y is determined according to, e.g., formula (1) given below.

$$Y = 0.3R + 0.59G + 0.11B \quad (1)$$

Then, a high-frequency emphasis signal is generated only from the green signal and added to the luminance signal Y, thereby obtaining an OG signal.

Alternatively, the green signal subjected to low-pass filter processing can be used as the luminance signal Y. In that case, the OG signal is generated only from the green signal.

In the SWY method, RGB pixels are all used when the luminance signal is generated by using color filters of primary color Bayer pattern shown in FIG. 21. In other words, the RAW signal obtained by digitizing the color signal output from the image pickup device per se is used as the luminance signal Y without regard to colors.

FIG. 22 shows the luminance signal Y obtained by the SWY method. In FIG. 22, suffixes indicating pixel positions are added to symbol Y representing the luminance signal. Usually, to suppress a carrier from being generated at pixel sampling in the image pickup device, a base signal is obtained by subjecting the luminance signal to horizontal and vertical low-pass filter (LPF) processing so as to make a filter-processed output zero at a Nyquist frequency.

In a case, for example, that a filter coefficient [1 2 1] is used in each of the horizontal and vertical LPF processing, a LPF-processed output Y22' corresponding to pixel Y22 can be determined according to the following formula (2).

$$Y22' = (Y11 + 2 \times Y12 + Y13 + 2 \times Y12 + 4 \times Y22 + 2 \times Y23 + Y31 + 2 \times Y32 + Y33)/16 \quad (2)$$

Next, a high-frequency emphasis signal is generated from the base signal and added to the base signal, whereby a high-frequency compensated signal (hereinafter, referred to as the SWY signal) can be obtained.

FIG. 23 shows resolvable spatial frequency characteristics of an OG signal and an SWY signal.

In FIG. 23, the frequency space in the horizontal direction of an object is represented along an x-axis, and the frequency space in the vertical direction is represented along a y-axis. The spatial frequency increases with increasing distance from the origin.

In the out-of-green method, since the luminance signal is generated mainly from the green signal, resolution limits of the OG signal in the horizontal and vertical directions are each equal to a Nyquist frequency (which is $\pi/2$ on each of the x and y axes). In diagonal directions, there are lines in which pixels do not exist, so that resolution frequency limits in the diagonal directions are lower than those in the horizontal and vertical directions. Accordingly, the resolvable spatial frequency is within a diamond-shaped region 2100 shown in FIG. 23.

In the SWY method, since the luminance signal is generated by using all the pixels, the resolvable spatial frequency is within a square region 2101 shown in FIG. 23 in a case that the object is achromatic. However, in the case of, e.g., a red object, since substantially no luminance signal is output from pixels other than red pixels, the resolvable spatial frequency is within a region 2102 which is one-fourth as large as the region 2101 for achromatic object.

As described above, both the out-of-green method and the SWY method have a disadvantage in respect of resolvable spatial frequency. To obviate this, there has been proposed a signal processing apparatus in which whether an image is a white-and-black image or a color image is determined, and in the case of an achromatic object, the SWY signal, instead of the OG signal, is applied to diagonal regions such as ones shown by 2103 in FIG. 23 (see, Japanese Laid-open Patent Publication No. 2009-105977).

There has also been proposed a luminance signal generation apparatus in which in the case of an achromatic object, an angle-adaptive SWY signal obtained by subjecting a signal to horizontal and vertical LPF processing and by subjecting the resultant signal to 45-degree direction LPF processing (or 135-degree direction LPF processing) is applied to diagonal regions each extending along a 45-degree line direction (or 135-degree line direction), whereas an OG signal is applied to a Nyquist region (see, Japanese Laid-open Patent Publication No. 2008-72377).

In an image pickup apparatus for photographing an image by using color filters of primary color Bayer pattern shown in FIG. 21, a sampling frequency of an image pickup device must be equal to or higher than two times a spatial frequency of an object in order to generate an accurate image. This is because there is a fear that a false color (color moire) occurs at, e.g., a bright-dark boundary of the object, if the spatial frequency of the object exceeds the Nyquist frequency (which is one-half of the sampling frequency) of the image pickup device.

The apparatus disclosed in Japanese Laid-open Patent Publication No. 2009-105977 does not consider the influence of a false color appearing at near horizontal and vertical (HV) Nyquist regions upon the determination to determine whether an image is a white-and-black image or a color image. As a result, even in the case of an achromatic object, the object is determined as being a chromatic object at the HV Nyquist regions due to the influence of a false color, and the OG signal is used. As a result, a problem is posed that aliasing occurs in the OG signal.

The apparatus disclosed in Japanese Laid-open Patent Publication No. 2008-72377 applies to the HV Nyquist regions the adaptive OG signal that limits the horizontal or vertical bandwidth in order to improve the resolution as compared to a case where the SWY signal is used. However, a problem is posed that at near the HV Nyquist regions, diagonal aliasing in the OG signal becomes large with increasing distance from the Nyquist point.

SUMMARY OF THE INVENTION

The present invention provides a luminance signal generation apparatus and a luminance signal generation method capable of suppressing an occurrence of aliasing at near horizontal and vertical Nyquist regions in the case of an achromatic object, an image pickup apparatus having the luminance signal generation apparatus, and a storage medium storing a program for executing the luminance signal generation method.

According to one aspect of this invention, there is provided a luminance signal generation apparatus that generates a luminance signal according to an image signal constituted by color signals including a first color signal, comprising a first luminance signal generation unit configured to generate a first luminance signal by interpolating the first color signal on pixels not corresponding to the first color signal, a second luminance signal generation unit configured to generate a second luminance signal by using the color signals as a raw luminance signal at pixel positions, a direction determination unit configured to determine a direction of an edge of the image signal and output an angle determination signal, a hierarchical image generation unit configured to generate, from the image signal, hierarchical image signals having different frequencies, a false color region detection unit configured to determine a false color region in each of the hierarchical image signals and output a false color region detection signal, a first selection unit configured to select one of the hierarchical image signals according to the false color region detection signal, and a mixing unit configured to mix the first and second luminance signals according to the angle determination signal and a chroma signal obtained from the selected one of the hierarchical image signals, thereby generating a third luminance signal.

With this invention, it is possible to improve the sharpness at near horizontal and vertical Nyquist regions in the case of an achromatic object, whereby a satisfactory luminance signal can be obtained.

Further features of the present invention will become apparent from the following description of exemplary embodiments with reference to the attached drawings.

DESCRIPTION OF THE EMBODIMENTS

The present invention will now be described in detail below with reference to the drawings showing preferred embodiments thereof.

First Embodiment

Figure 1:
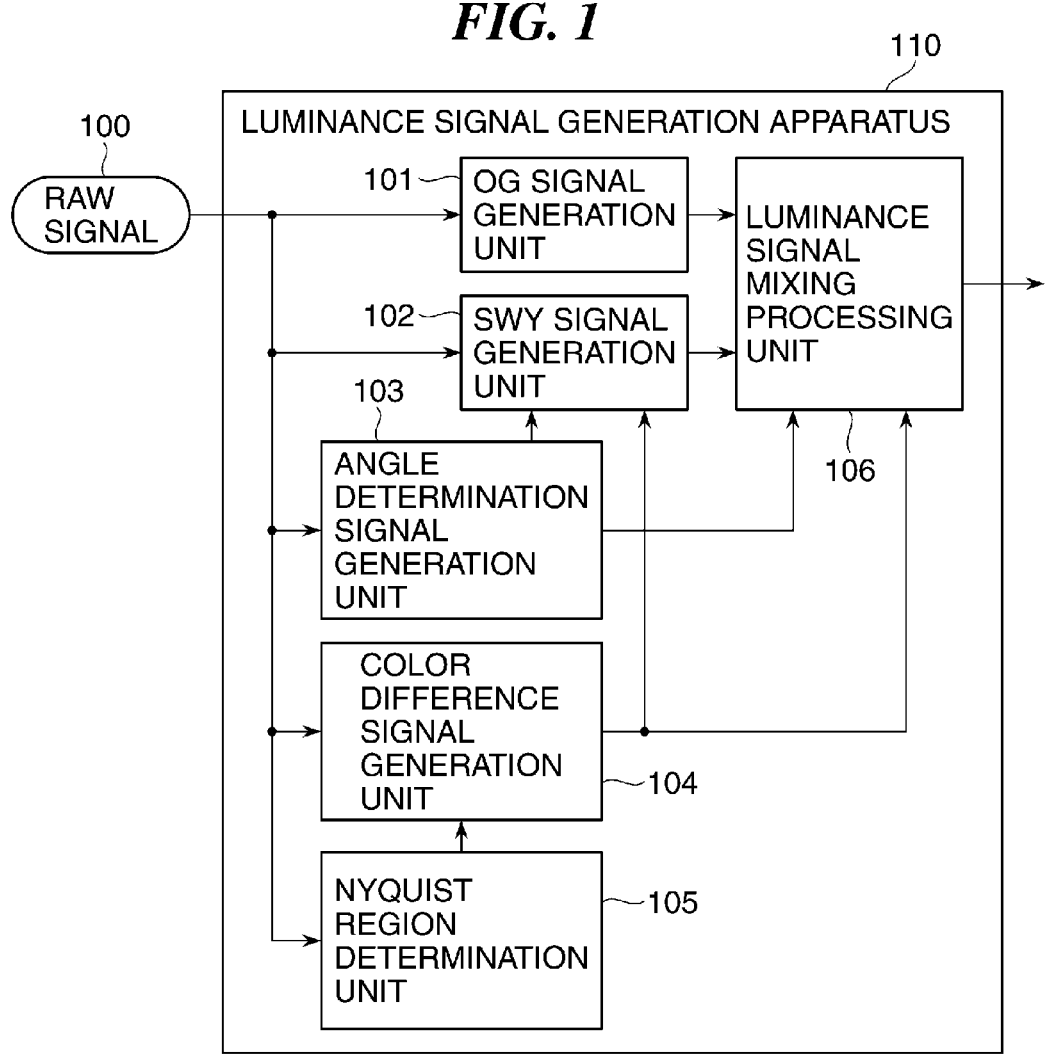
FIG. 1 is a block diagram schematically showing an example construction of a luminance signal generation apparatus according to a first embodiment of this invention.

FIG. 1 schematically shows in block diagram an example construction of a luminance signal generation apparatus according to a first embodiment of this invention.

The luminance signal generation apparatus 110 shown in FIG. 1 is applied to, e.g., a signal processing circuit of an image pickup apparatus that includes an image pickup device having color filters of primary color Bayer pattern (three-color filters). The signal processing circuit performs signal processing such as so-called developing processing.

The luminance signal generation apparatus 110 is supplied with an image signal (hereinafter, referred to as the RAW signal) 100, which is obtained by performing A/D conversion to digitize an analog signal read from an image pickup device (not shown) and by subjecting the digitized signal to white balance processing.

The luminance signal generation apparatus 110 includes an OG signal generation unit 101, SWY signal generation unit 102, angle determination signal generation unit 103, color difference signal generation unit 104, Nyquist region determination unit 105, and luminance signal mixing processing unit 106.

The OG signal generation unit 101 generates a first luminance signal (OG signal) based on the RAW signal 100 by using, e.g., the out-of-green method previously described. Alternatively, the technique disclosed in Japanese Laid-open Patent Publication No. 2008-72377 can be used for the generation of the first luminance signal.

The angle determination signal generation unit 103 generates an angle determination signal (object angle information) based on the RAW signal 100.

Figure 2:
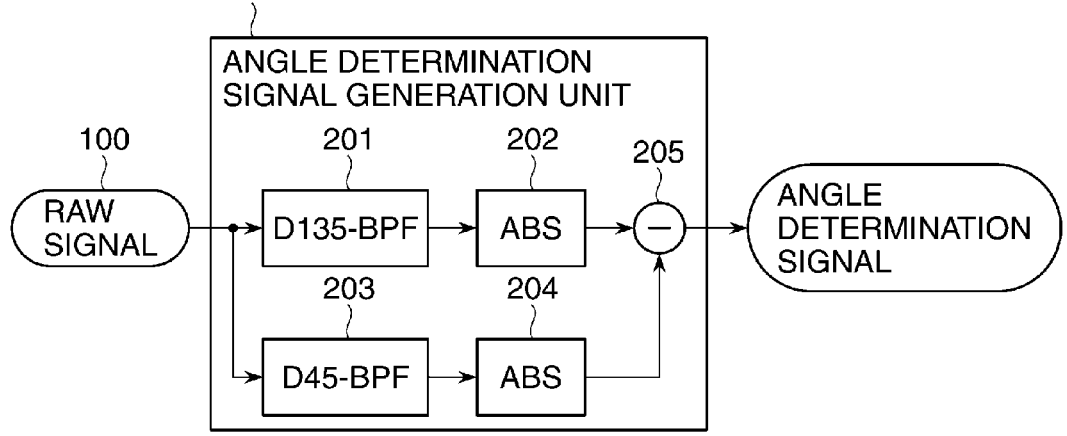
FIG. 2 is a block diagram showing an example construction of an angle determination signal generation unit shown in FIG. 1.

FIG. 2 shows in block diagram an example construction of the angle determination signal generation unit 103.

Referring to FIG. 2, the angle determination signal generation unit 103 inserts zero data into pixels of the RAW signal 100 other than green pixels by using a circuit (not shown), and performs low-pass filter processing on the RAW signal 100 for limiting bandwidths in vertical and horizontal directions, thereby generating an image signal only consisting of a green signal (first color signal). The image signal is supplied to a band-pass filter (D135-BPF) 201 for emphasizing a 45-degree line and to a band-pass filter (D45-BPF) 203 for emphasizing a 135-degree line. An output from the D135-BPF 201 (first band-pass signal) is supplied to an absolute circuit (ABS) 202, whereas an output from the D45-BPF 203 (second band-pass signal) is supplied to an absolute circuit (ABS) 204.

The D135-BPF 201 and the ABS 202 generate a 45-degree line detection signal from the image signal, whereas the D45-BPF 203 and the ABS 204 generate a 135-degree line detection signal from the image signal.

A subtracter 205 subtracts the 135-degree line detection signal output from the ABS 204 from the 45-degree line detection signal output from the ABS 202, and outputs an angle determination signal representing a subtraction result.

Referring to FIG. 1 again, the color difference signal generation unit 104 generates color difference signals R-G and B-G from the RAW signal on a per pixel basis or on a per predetermined region basis, and outputs these color difference signals. The Nyquist region determination unit 105 receives the RAW signal and determines a Nyquist region (i.e., a region where a false color signal generates).

The following is a description of processing performed by the color difference signal generation unit 104 and the Nyquist region determination unit 105.

Figure 3:
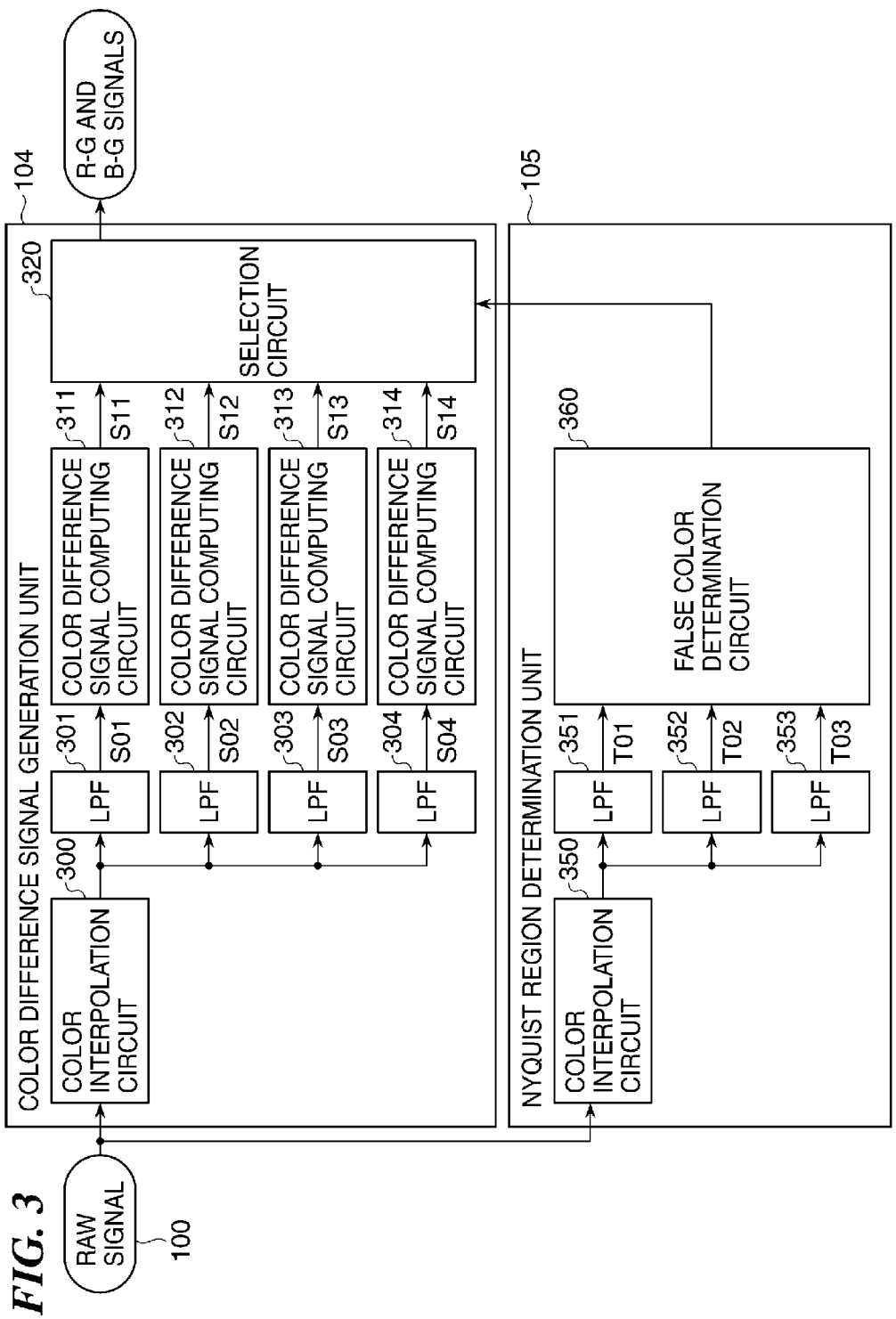
FIG. 3 is a block diagram showing an example construction of a color difference signal generation unit and a Nyquist region determination unit, which are shown in FIG. 1.

FIG. 3 shows in block diagram an example construction of the color difference signal generation unit 104 and the Nyquist region determination unit 105.

Referring to FIG. 3, the color difference signal generation unit 104 includes a color interpolation circuit 300, low-pass filters (LPFs) 301 to 304, color difference signal computing circuits 311 to 314, and selection circuit 320. The Nyquist region determination unit 105 includes a color interpolation circuit 350, low-pass filters (LPFs) 351 to 353, and false color determination circuit 360.

Figure 4:
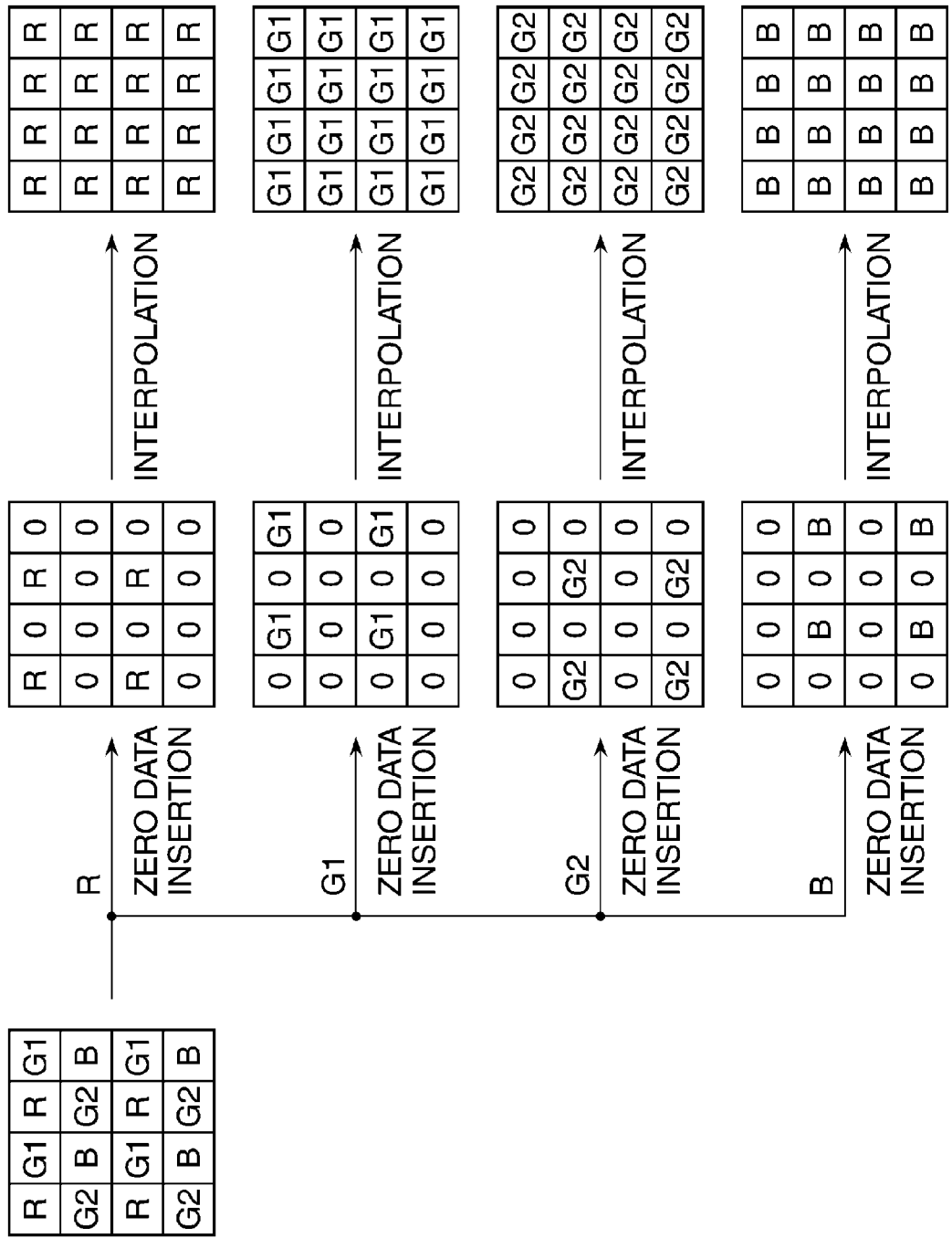
FIG. 4 is a view showing interpolation processing performed by a color interpolation circuit of the color difference signal generation unit.

The color interpolation circuit 300 of the color difference signal generation unit 104 is supplied with the RAW signal 100. FIG. 4 shows interpolation processing performed by the color interpolation circuit 300.

As described referring to FIG. 21, color filters of Bayer pattern are each constituted by a R filter, a B filter, a G1 filter located vertically above the B filter, and a G2 filter located vertically below the R filter. Hereinafter, pixel signals respectively output from pixels corresponding to the G1, G2, R, and B filters will respectively be referred to as the G1, G2, R, and B signals or as the G1, G2, R, and B image signals.

As shown in FIG. 4, the color interpolation circuit 300 decomposes the RAW signal 100 into image signals for respective colors that correspond to the R, G1, G2, and B filters, inserts zero data into pixels not corresponding to the filters, and performs interpolation processing by using LPFs (digital filters) to thereby obtain image signals for R, G1, G2, and B colors for all the pixels.

The image signals for respective colors output from the color interpolation circuit 300 are supplied to the LPFs 301 to 304 whose cut-off frequencies are different from one another.

Figure 5:
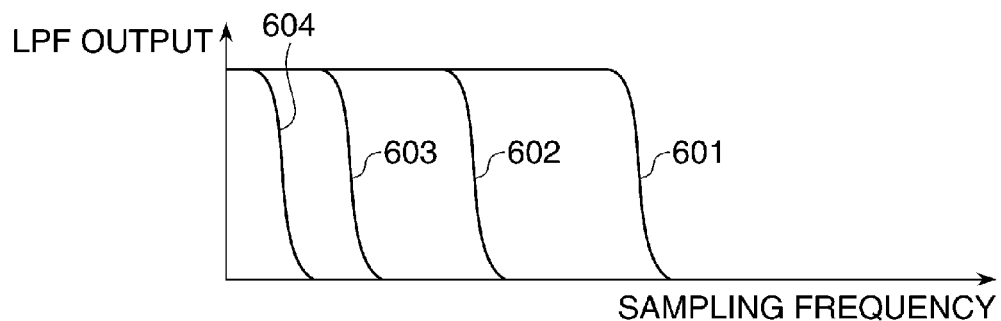
FIG. 5 is a view showing example frequency characteristics of LPFs of the color difference signal generation unit.

FIG. 5 shows example frequency characteristics of the LPFs 301 to 304 of the color difference signal generation unit 104.

As shown in FIG. 5, the LPFs 301 to 604 have frequency characteristics 601 to 604, respectively. Cut-off frequencies of the LPFs 301 to 304 are set to be higher in this order. In other words, image signals S01 to S04 output from the LPFs 301 to 304 contain frequency components which are higher in the order of the image signals S01 to S04.

The image signals S01 to S04 are each constituted by image signals for R, G1, G2, and B colors whose frequency components are limited.

The image signals S01 to S04 are supplied to respective ones of the color difference signal computing circuits 311 to 314. Based on the image signals S01 to S04, the computing circuits 311 to 314 determine color difference signals according to, e.g., the following procedures.

The color difference signal computing circuit 311 generates color difference signals R-G and B-G according to vertical and horizontal correlation degrees in the pixel of interest. More specifically, when determining that the horizontal correlation degree is higher than the vertical correlation degree, the computing circuit 311 subtracts the G1 signal from the R signal to generate the color difference signal R-G, and subtracts the G2 signal from the B signal to generate the color difference signal B-G.

On the other hand, when determining that the vertical correlation degree is higher than the horizontal correlation degree, the computing circuit 311 subtracts the G2 signal from the R signal to generate the color difference signal R-G, and subtracts the G1 signal from the B signal to generate the color difference signal B-G.

It should be noted that the color difference signal R-G can be determined by adding and averaging a value obtained by subtracting the G1 signal from the R signal and a value obtained by subtracting the G2 signal from the R signal, while using a weighting coefficient that varies according to a difference between these values.

Similarly, the color difference signal B-G can be determined by adding and averaging a value obtained by subtracting the G1 signal from the B signal and a value obtained by subtracting the G2 signal from the B signal, while using a weighting coefficient that varies according to a difference between these values.

The color difference signal computing circuits 312 to 314 each perform the same processing as that performed by the computing circuit 311.

The color difference signals R-G and B-G computed by the color difference signal computing circuits 311 to 314 are respectively supplied as color difference signals S11 to S14 to a selection circuit 320 (described later).

The following is a description of the Nyquist region determination unit 105 shown in FIG. 3. The Nyquist region determination unit 105 includes the color interpolation circuit 350 to which the RAW signal 100 is supplied. The color interpolation circuit 350 obtains image signals for R, G1, G2, and B colors for all the pixels from the RAW signal 100, as with the color interpolation circuit 300 of the color difference signal generation unit 104.

Figures 20, 21:
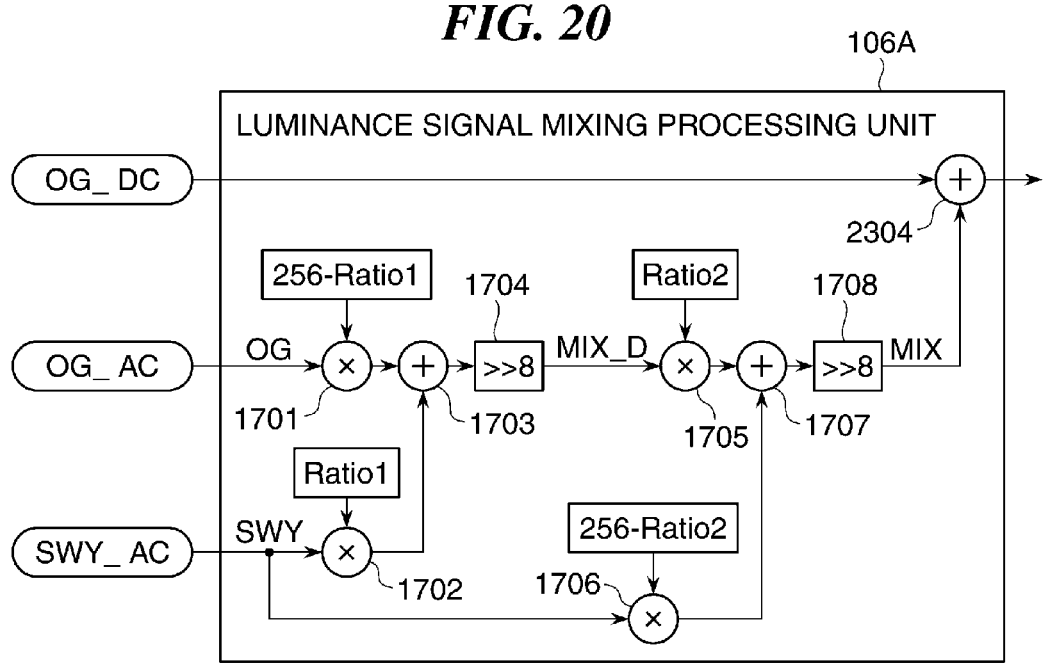
FIG. 20 is a block diagram showing an example construction of a luminance signal mixing processing unit shown in FIG. 19.
FIG. 21 is a view showing one unit of a primary color Bayer pattern.
Figures 22, 23:
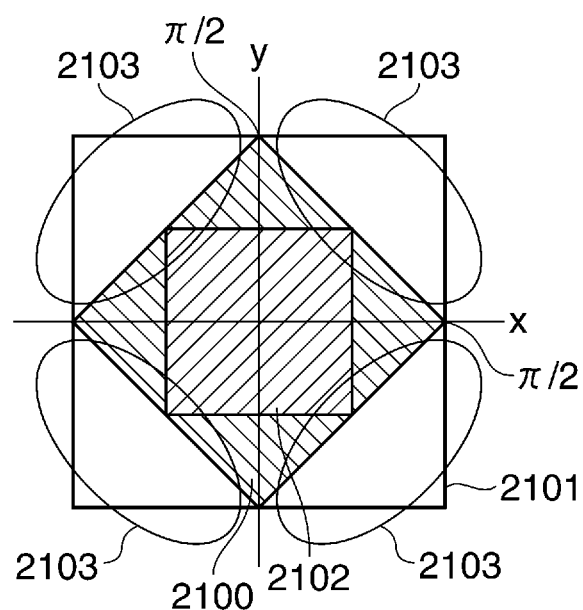
FIG. 22 is a view showing a luminance signal Y obtained by an SWY method.
FIG. 23 is a view showing resolvable spatial frequency characteristics of an OG signal and an SWY signal.

In the Bayer pattern shown in FIG. 21, the number of pixels that correspond to G1 filters, the number of pixels that correspond to G2 filters, the number of pixels that correspond to R filters, and the number of pixels that correspond to B filters are the same as one another. In other words, an interval between pixels corresponding to G1 filters, an interval between pixels corresponding to G2 filters, an interval between pixels corresponding to R filters, and an interval between pixels corresponding to B filters are the same as one another. Accordingly, a region where aliasing noise generates in R and B image signals can be identified by detecting a region where aliasing noise generates based on G1 and G2 image signals.

The image signals for respective colors output from the color interpolation circuit 350 are supplied to the LPFs 351 to 353 whose cut-off frequencies are different from one another.

Figure 6:
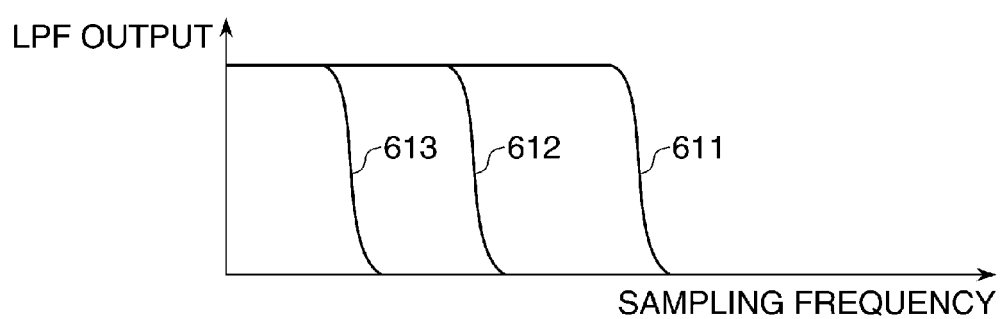
FIG. 6 is a view showing example frequency characteristics of LPFs of the Nyquist region determination unit.

FIG. 6 shows example frequency characteristics of the LPFs 351 to 353 of the Nyquist region determination unit 105.

As shown in FIG. 6, the LPFs 351 to 353 have frequency characteristics 611 to 613, respectively. Cut-off frequencies of the LPFs 351 to 353 are set to be higher in this order. In other words, image signals T01 to T03 output from the LPFs 351 to 353 contain frequency components which are higher in the order of the image signals T01 to T03.

It is assumed in this example that the frequency characteristics of the LPFs 301, 351 are the same as each other, the frequency characteristics of the LPFs 302, 352 are the same as each other, and the frequency characteristics of the LPF 303, 353 are the same as each other.

The image signals T01 to T03 output from the LPFs 351 to 353 are supplied to the false color determination circuit 360. As described later, the false color determination circuit 360 determines a region in which a false color signal generates.

Figure 7:
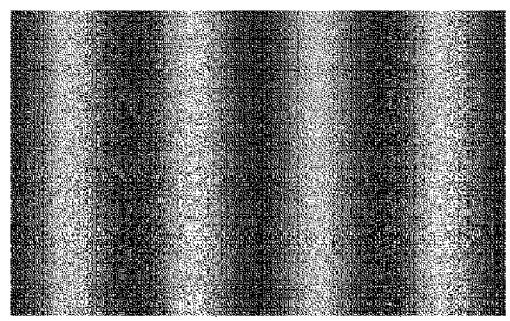
FIG. 7 is a view showing an example of an object that has vertical stripes with gradation.

FIG. 7 shows an example of an object having vertical stripes with gradation, and FIGS. 8A to 8I show G1 and G2 signal values in an image signal obtained by photographing the object shown in FIG. 7.

In FIGS. 8A to 8I, horizontal positions of pixels are represented along the abscissa. G1 signals obtained from pixels corresponding to G1 filters in a given line of the image pickup device and G2 signals obtained from pixels corresponding to G2 filters in another line of the image pickup device are shown alternately in FIGS. 8A, 8D and 8G.

Horizontal and vertical sampling intervals of pixels that correspond to the G1 filters are the same as those of pixels that correspond to the G2 filters. The spatial phase of the pixels corresponding to the G1 filters is deviated from that of the pixels corresponding to the G2 filters by one-half of the sampling intervals.

In the case of the object having vertical stripes shown in FIG. 7, an image of the object is equally incident to all the rows of the image pickup device. Accordingly, an image signal representing the gradation of the object (vertical stripes) can be attained based on the G1 and G2 signals arranged corresponding to the horizontal positions of pixels.

Figure 8:
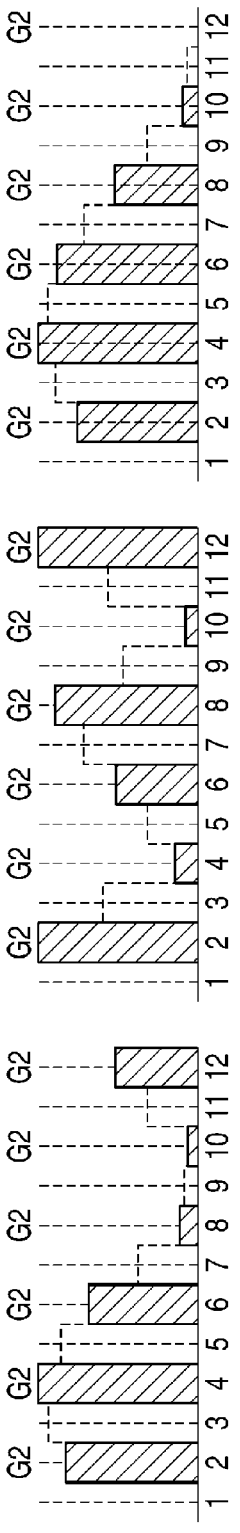
FIGS. 8A to 8I are views showing G1 signal values and/or G2 signal values of an image signal obtained by photographing the object shown in FIG. 7.

It is assumed that in FIG. 8A the vertical stripe frequency is sufficiently lower than Nyquist frequencies of the G1 and G2 filters, in FIG. 8D the vertical stripe frequency is higher than that in the case of FIG. 8A and slightly lower than the Nyquist frequencies of the G1 and G2 filters, and in FIG. 8G the vertical stripe frequency is higher than the Nyquist frequencies of the G1 and G2 filters.

FIGS. 8B, 8E and 8H respectively show states after the G1 signals extracted from the G1 and G2 signals shown in FIGS. 8A, 8D and 8G are subjected to interpolation processing.

FIGS. 8C, 8F and 8I respectively show states after the G2 signals extracted from the G1 and G2 signals shown in FIGS. 8A, 8D and 8G are subjected to interpolation processing.

As understood from FIGS. 8A to 8I, if the spatial frequency of the object is sufficiently lower than the Nyquist frequencies of the G1 and G2 filters, a phase deviation between the interpolated G1 and G2 signals is small. As the spatial frequency of the object becomes closer to the Nyquist frequencies of the G1 and G2 filters, a phase deviation between the interpolated G1 and G2 signals becomes larger. If the spatial frequency of the object exceeds the Nyquist frequencies of the G1 and G2 filters, the phases of the interpolated G1 and G2 signals are nearly inverted to each other.

In other words, by detecting a phase difference between the interpolated G1 and G2 signals, a high-frequency region where a false color generates can be determined.

Figure 9:
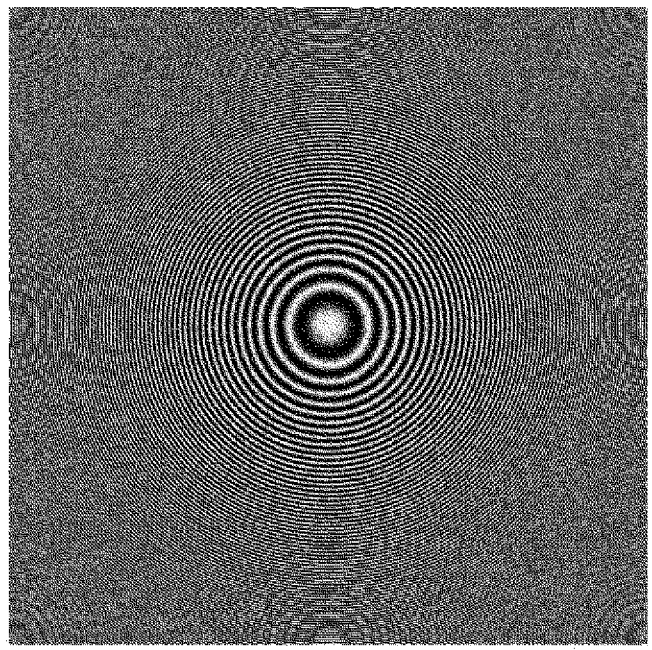
FIG. 9 is a view showing a CZP (circular zone plate)
Figure 10:
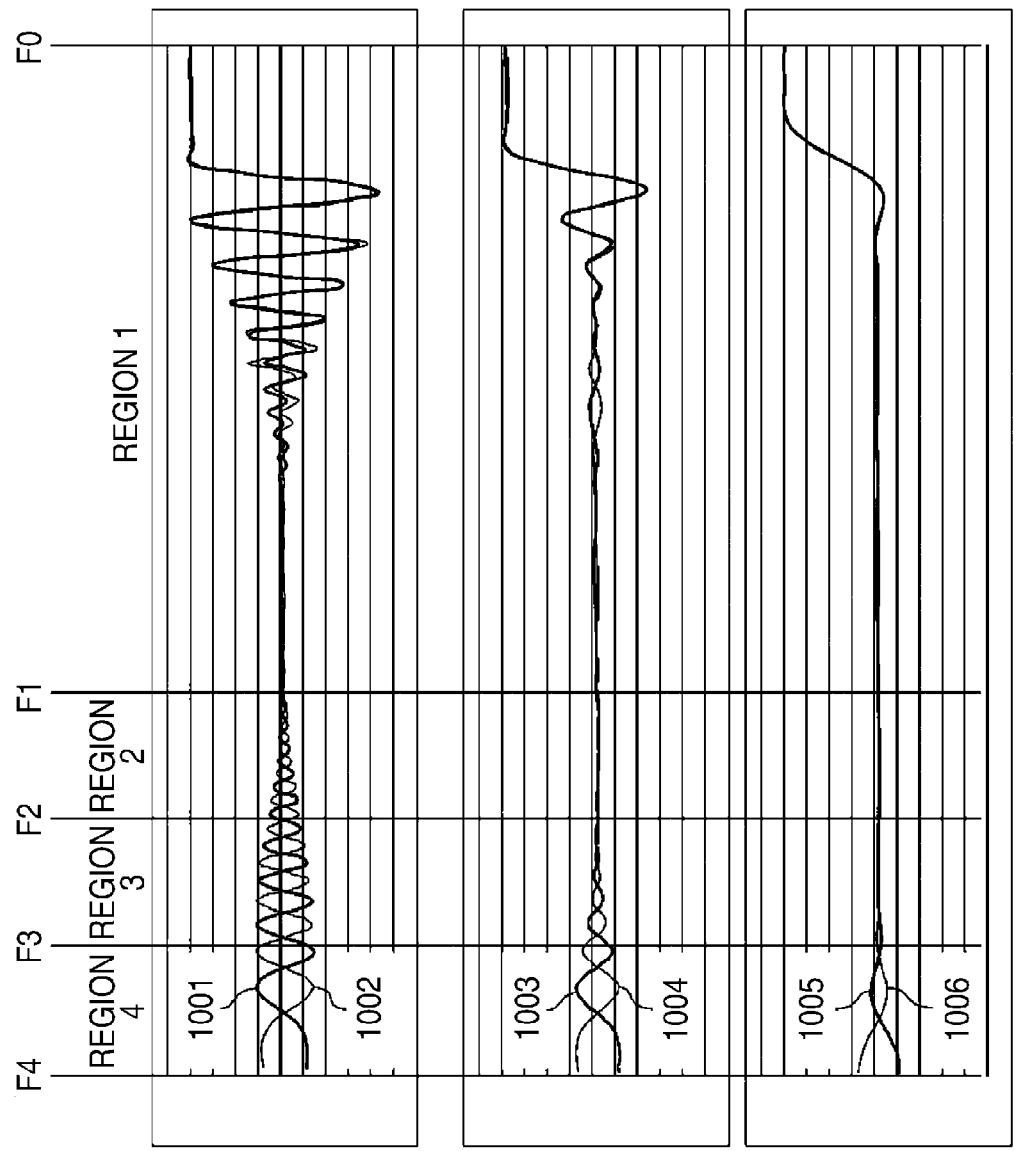
FIG. 10 is a view in which interpolated G1 and G2 signal values are plotted along an axis extending horizontally from the center of the CZP.

The following is a description of operation of the false color determination circuit 360. In FIG. 9, a CZP (circular zone plate) is shown. In FIG. 10, interpolated G1, G2 signal values are plotted along an axis extending horizontally from the center of the CZP.

In the CZP shown in FIG. 9, there are a number of concentric circles whose origins are centered on the center of an image. The spatial frequency becomes higher toward outward from the center of the image or from the center of the concentric circles.

In FIG. 10, curved lines 1001, 1002 represent the interpolated G1, G2 signals of the image signal T01, curved lines 1003, 1004 represent the interpolated G1, G2 signals of the image signal T02, and curved lines 1005, 1006 represent the interpolated G1, G2 signals of the image signal T03.

In FIG. 10, symbols F0 to F4 each denote the spatial frequency of the CZP. Symbol F0 represents the spatial frequency at the center of the image. The spatial frequency becomes higher toward outward of the image, i.e., in the order from F1 to F4.

Based on a characteristic difference between the image signals respectively constituted by the interpolated G1 and G2 signals, the false color determination circuit 360 shown in FIG. 3 determines a false color region where a false color signal generates.

More specifically, the false color determination circuit 360 determines a false color region, if the following formula (3) is satisfied by gradients of the image signals constituted by the interpolated G1, G2 signals.

$$\Delta G1h \times \Delta G2h < 0 \text{ or } \Delta G1v \times \Delta G2v < 0 \quad (3)$$

In formula (3), symbols $\Delta G1h$ and $\Delta G1v$ respectively represent horizontal and vertical gradients of the image signal constituted by the interpolated G1 signal, and $\Delta G2h$ and $\Delta G2v$ respectively represent horizontal and vertical gradients of the image signal constituted by the interpolated G2 signal.

Figure 11A:
FIGS. 11A and 11B are views each showing an example digital filter used in a false color determination circuit shown in FIG. 3.
Figure 11B:

FIGS. 11A and 11B each show an example digital filter used in the false color determination circuit 360. The digital filter shown in FIG. 11A is used to determine the horizontal gradient of image signal, whereas the digital filter shown in FIG. 11B is used to determine the vertical gradient of image signal. The digital filters shown in FIGS. 11A and 11B are mere examples and not limitative.

It is possible to determine a false color region not on a per pixel basis but on a per pixel region basis. For example, a region of interest is determined as being a false color region, if a ratio of image signals whose gradients satisfy the formula (3) to all the image signals determined for all the pixels contained in the region of interest exceeds a predetermined threshold value.

For the image signal T01 shown by the curves 1001, 1002 in FIG. 10, it is possible to determine frequency regions 2 to 4 where the spatial frequency is higher than F1 as being a false color region. For the image signal T02 shown by the curves 1003, 1004, frequency regions 3 and 4 where the spatial frequency is higher than F2 can be determined as being a false color region. For the image signal T03 shown by the curves 1005, 1006, frequency region 4 where the spatial frequency is higher than F3 can be determined as being a false color region.

The false color determination circuit 360 in FIG. 3 supplies a false color region determination signal (false color region detection signal) to the selection circuit 320. In response to the false color region determination signal, the selection circuit 320 selects the color difference signal S11 (generated from the image signal having the same frequency as that of the image signal T01) for the frequency region 1 determined as not being a false color region in the image signal T01.

The selection circuit 320 selects the color difference signal S12 (generated from the image signal having the same frequency as that of the image signal T02) for the frequency region 2 determined as being a false color region in the image signal T01 but as not being a false color region in the image signal T02.

The selection circuit 320 selects the color difference signal S13 (generated from the image signal having the same frequency as that of the image signal T03) for the frequency region 3 determined as being a false color region in the image signal T02 but as not being a false color region in the image signal T03.

The selection circuit 320 selects the color difference signal S14 (generated from the image signal whose frequency is lower than that of the image signal T03) for the frequency region 4 determined as being a false color region in the image signal T03. As described above, the selection circuit 320 selects on a per pixel basis a color difference signal which does not contain a false color according to the false color region determination signal supplied from the false color determination circuit 360.

As previously mentioned, it is assumed in this example that the frequency characteristics of the LPFs 301, 351 are the same as each other, the frequency characteristics of the LPFs 302, 352 are the same as each other, and the frequency characteristics of the LPFs 303, 353 are the same as each other, but this is not limitative.

For example, to increase the probability that no false color is generated in the frequency region in the image signal S01 (this region being determined as not being a false color region in the image signal T01), an upper limit frequency of the image signal S01 can be set to be lower than that of the image signal T01.

Specifically, the cut-off frequency of the LPF 351 is set to be slightly higher than the cut-off frequency of the LPF 301. Similarly, the cut-off frequency of the LPF 352 is set to be slightly higher than that of the LPF 302, and the cut-off frequency of the LPF 353 is set to be slightly higher than that of the LPF 303.

In that case, however, there is a possibility of increasing a frequency region where the color resolution is lowered, as compared with the case where the frequency characteristics of the LPFs 301, 351 are the same as each other, those of the LPF 302, 352 are the same as each other, and those of the LPF 303, 353 are the same as each other.

To reduce a region where the color resolution is lowered, the cut-off frequencies of the LPFs 301 to 303 can be set to be slightly lower than respective ones of the cut-off frequencies of the LPFs 351 to 353. In that case, there is a possibility, for example, that there is a higher frequency in the image signal S01 than in the image signal T01. Accordingly, even in a frequency region determined as not being a false color region in the image signal T01, there is a possibility that a false color region appears in the image signal S01.

It is possible to adaptively determine according to what image should be created whether the cut-off frequencies of the LPFs 301 to 303 should be made the same as or different from those of respective ones of the LPFs 351 to 353.

Since the degree of influence affected by a reduction in resolution varies depending on the pattern of the object, it is possible to adaptively change the cut-off frequencies of the LPFs according to the pattern of the object.

As described above, the color difference signal generation unit 104 in this example generates image signals S01 to S04 by using the LPFs 301 to 304 having different cut-off frequencies and generates, from the image signals S01 to S04, color difference signals S11 to S14 in a hierarchical fashion. The Nyquist region determination unit 105 generates image signals T01 to T03, which are different in hierarchy from one another, by using the LPFs 351 to 353 having different cut-off frequencies, and detects a false color region on a per image signal basis.

According to from which of the image signals T01 to T03 a false color region is detected (i.e., according to a false color region determination signal), the selection circuit 320 of the color difference signal generation unit 104 selects one of color difference signals S11 to S14. In other words, in a frequency range where no false color generates, the selection circuit 320 selects, on a per pixel basis or on a per region basis, the color difference signal generated from the image signal which is highest in frequency hierarchy.

By doing this, the color resolution can be lowered as required to suppress a false color only in a frequency region where the false color generates, without the necessity of lowering the color resolution in a frequency region where no false color generates. As a result, both the improvement in color resolution and the suppression of false color can be achieved with excellent balance.

Figure 12:
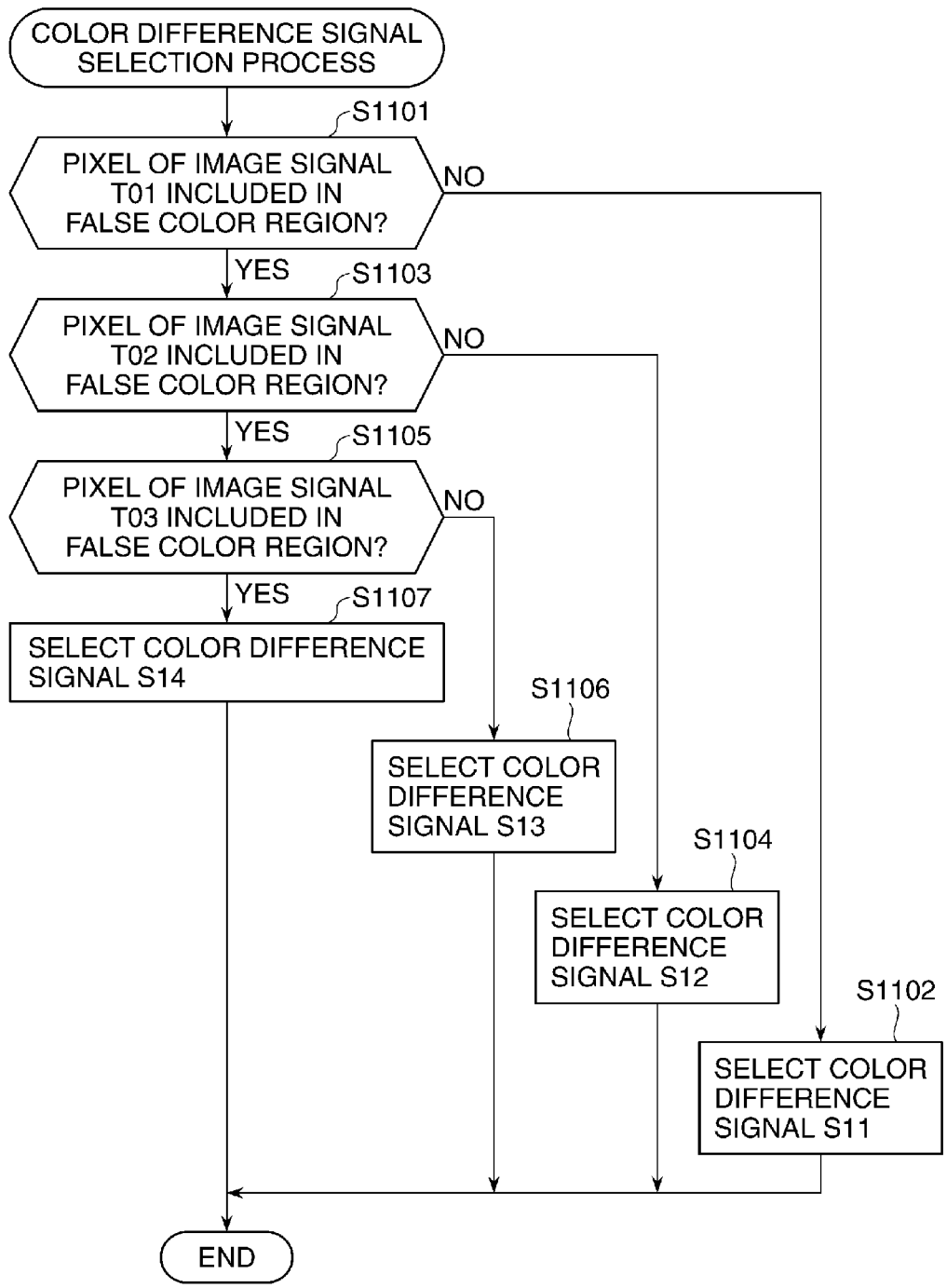
FIG. 12 is a flowchart showing a color difference signal selection process performed by a selection circuit shown in FIG. 3.

FIG. 12 shows in flowchart a color difference signal selection process performed by the selection circuit 320. The selection circuit 320 performs the selection process for example on a per pixel basis or on a per predetermined region basis. In the following, it is assumed that the process is performed on a per pixel basis.

In the selection process, the selection circuit 320 determines whether a pixel of the image signal T01 corresponding to a pixel of interest is determined as being included in a false color region by the false color determination circuit 360 (step S1101). If the answer to step S1101 is NO, the selection circuit 320 selects the color difference signal S11 for the pixel corresponding to the pixel of interest, as the color difference signal for the pixel of interest (step S1102), and completes the selection process.

On the other hand, if it is determined that the pixel of the image signal T01 corresponding to the pixel of interest is included in a false color region (i.e., if YES to step S1101), the selection circuit 320 determines whether a pixel of the image signal T02 corresponding to the pixel of interest is determined as being included in a false color region by the determination circuit 360 (step S1103).

If the answer to step S1103 is NO, the selection circuit 320 selects the color difference signal S12 for the pixel corresponding to the pixel of interest, as the color difference signal for the pixel of interest (step S1104), and completes the process.

If it is determined that the pixel of the image signal T02 corresponding to the pixel of interest is included in a false color region (i.e., if YES to step S1103), the selection circuit 320 determines whether a pixel of the image signal T03 corresponding to the pixel of interest is determined as being included in a false color region by the determination circuit 360 (step S1105). If NO to step S1105, the selection circuit 320 selects the color difference signal S13 for the pixel corresponding to the pixel of interest, as the color difference signal for the pixel of interest (step S1106), and completes the process.

On the other hand, if it is determined that the pixel of the image signal T03 corresponding to the pixel of interest is included in a false color region (i.e., if YES to step S1105), the selection circuit 320 selects the color difference signal S14 for the pixel corresponding to the pixel of interest, as the color difference signal for the pixel of interest (step S1107), and completes the process.

The selection circuit 320 performs the color difference signal selection process for all the pixels of the image signal, and outputs for each pixel the color difference signal (color difference signals R-G, B-G) selected from among the color difference signals S11 to S14.

In the above, a case has been described where any of the color difference signals generated from hierarchical image signals having different frequencies is selected to suppress a false color, but this is not limitative.

The luminance signal generation apparatus 110 extracts image signals of the G1 and G2 filters (first and second color filters) from the image signal obtained by the image pickup device of Bayer pattern, and interpolates the extracted image signals. The G1 and G2 filters are disposed at the same intervals as each other, but spatial phases of these filters are deviated from each other. As shown in FIGS. 8A to 8I and in FIG. 10, the interpolated G1, G2 signals have phases inverted from each other in a high-frequency region.

Accordingly, based on gradients of the G1 and G2 signals and/or a difference between the G1 and G2 signals, the luminance signal generation apparatus 110 is capable of determining whether a region of interest (a pixel of interest) is included in a high-frequency region. When determining that the pixel of interest is included in a high-frequency region, the luminance signal generation apparatus 110 generates a predetermined signal (such as a color difference signal or a luminance signal) from an image signal whose the cut-off frequency is made to be lowered to a level where the pixel of interest is not determined as being included in a high-frequency region. It is therefore possible to suppress a false color and moire.

It should be noted that it is possible for the luminance signal generation apparatus 110 to set a flag in the image signal that represents a result of determination whether or not the pixel of interest is included in a high-frequency region and to delegate the generation of the predetermined signal (such as a color difference signal or a luminance signal) to an apparatus at a subsequent stage.

The SWY signal generation unit 102 shown in FIG. 1 generates a second luminance signal based on the RAW signal 100.

Figure 13:
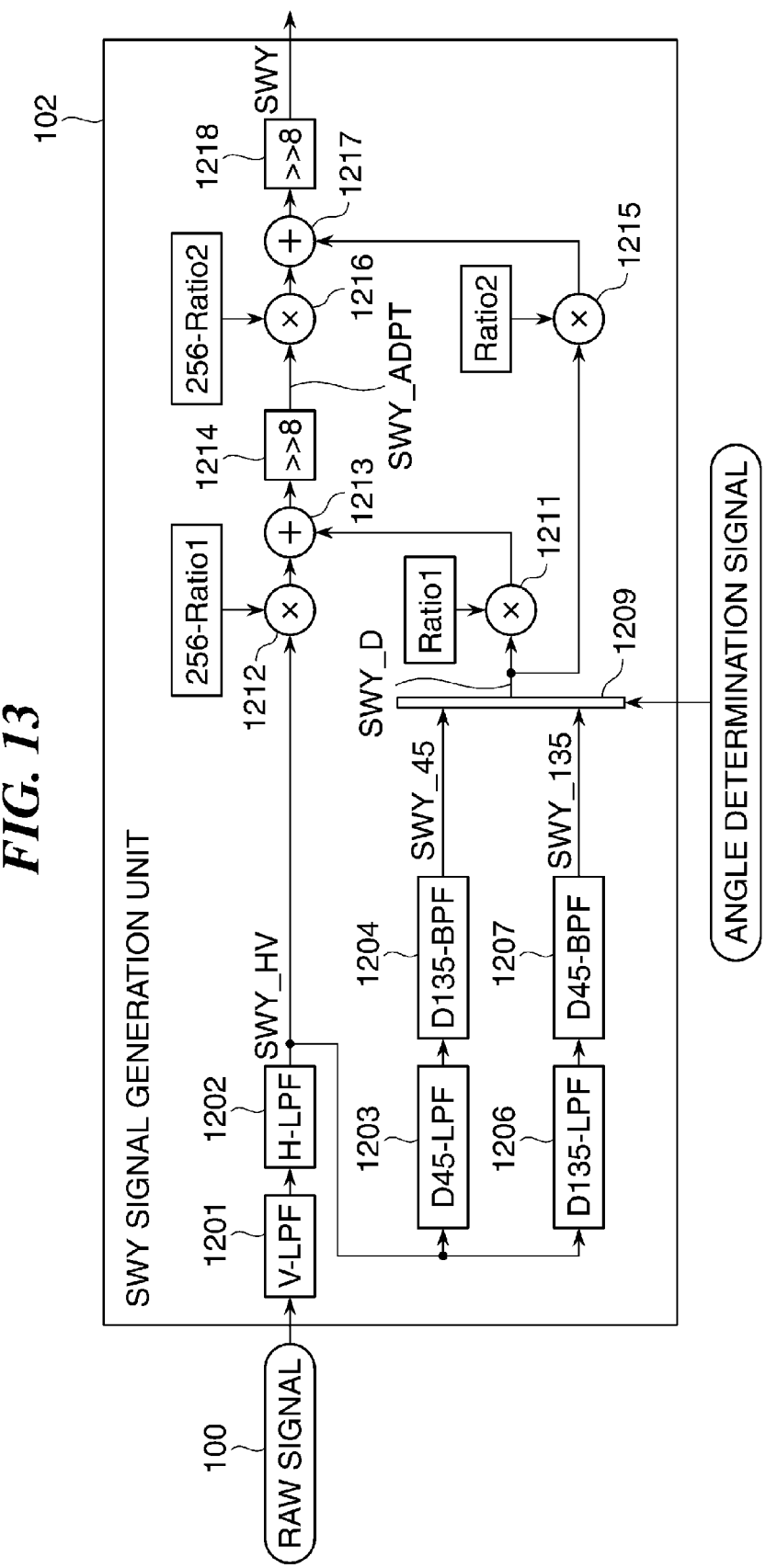
FIG. 13 is a block diagram showing an example construction of an SWY signal generation unit shown in FIG. 1.

FIG. 13 shows in block diagram an example construction of the SWY signal generation unit 102.

Referring to FIG. 13, a vertical low-pass filter (V-LPF) 1201 of the SWY signal generation unit 102 is supplied with a RAW signal 100 and limits a vertical bandwidth of the RAW signal 100. A horizontal bandwidth of an output of the V-LPF 1201 is limited by a horizontal low-pass filter (H-LPF) 1202. The H-LPF 1202 outputs a general-purpose SWY luminance signal SWY_HV.

A signal of primary color Bayer pattern is excellent in RGB primary color separation owing to filter spectral sensitivity. Accordingly, to sufficiently suppress luminance aliasing, a diagonal bandwidth limitation is required as well as the vertical and horizontal bandwidth limitations.

In the case of an achromatic object, the resolvable spatial frequency of an SWY signal is higher than that of an OG signal since the SWY signal is generated based on all the pixels for respective colors without regard to colors. On the other hand, in a case that the object is chromatic, the OG signal is superior to the SWY signal except for diagonal regions.

The SWY signal generation unit 102 has diagonal LPFs for limiting 45-degree and 135-degree direction bandwidths as well as the low-pass filters for limiting the horizontal and vertical bandwidths. According to angle information and chroma information on the object, the SWY signal generation unit 102 performs selection from among three types of bandwidth-limited signals or performs weighted addition of these signals, as will be described later.

A two-dimensional filter (D45-LPF) 1203 limits a 45-degree direction bandwidth of the SWY_HV signal output from the H-LPF 1202. A two-dimensional band-pass filter (D135-BPF) 1204 for detecting a 45-degree line edge generates from an output of the D45-LPF 1203 an SWY signal SWY_45 for 45-degree line (i.e., a fourth luminance signal).

A two-dimensional filter (D135-LPF) 1206 limits a 135-degree direction bandwidth of the SWY_HV signal. A two-dimensional band-pass filter (D45-BPF) 1207 for detecting a 135-degree line edge generates from an output of the D135-LPF 1206 an SWY signal SWY_135 for 135-degree line (i.e., a fifth luminance signal).

According to an angle determination signal output from the angle determination signal generation unit 103 shown in FIG. 1, a selector 1209 selects either the SWY_45 signal or the SWY_135 signal as an SWY signal SWY_D (i.e., a selected luminance signal). In this example, the SWY_45 signal is selected if the angle determination signal is positive, whereas the SWY_135 signal is selected if the angle determination signal is negative.

A multiplier 1212 multiplies the SWY luminance signal SWY_HV (i.e., a sixth luminance signal) by a weighted-addition coefficient 256-Ratio1, which is computed based on the angle determination signal output from the angle determination signal generation unit 103. A multiplier 1211 multiplies the diagonal SWY signal SWY_D by a weighted-addition coefficient Ratio1, which is computed based on the angle determination signal output from the signal generation unit 103. An adder 1213 adds outputs of the multipliers 1212, 1211 together, and outputs an addition result as an addition signal.

A shifter 1214 shifts the addition signal, and outputs a shift result as an angle-adaptive SWY luminance signal SWY_ADPT.

In other words, the SWY luminance signal SWY_ADPT is calculated according to the following formula (4).

$$SWY\_ADPT = SWY\_D \times Ratio1 + SWY\_HV \times 256\text{-}Ratio1 >> 8 \quad (4)$$

Specifically, when the angle-adaptive SWY luminance signal SWY_ADPT is generated, the SWY_D signal is applied to a diagonal region where the OG signal is affected by aliasing, whereby a high-frequency signal free from aliasing can be generated.

The angle determination signal output from the angle determination signal generation unit 103 represents, if positive, a region along the 45-degree line, and if negative, a region along the 135-degree line. The angle determination signal represents a region closer to the 45-degree line or the 135-degree line with increasing absolute value of the angle determination signal, and represents a region closer to the 0-degree line or the 90-degree line with decreasing absolute value thereof.

Figure 14:
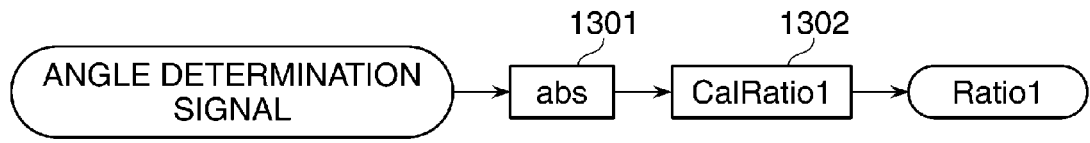
FIG. 14 is a block diagram showing an example construction of a computing circuit for computing a weighted-addition coefficient Ratio1 shown in FIG. 13.
Figure 15:
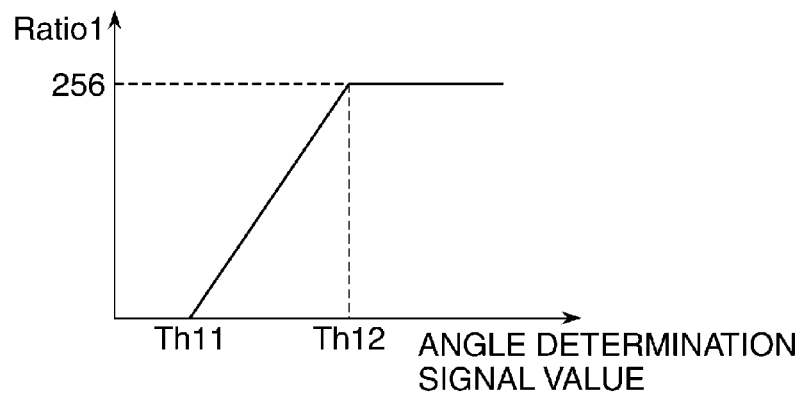
FIG. 15 is a view showing a relation between angle determination signal and weighted-addition coefficient Ratio1.

FIG. 14 shows in block diagram an example construction of a computing circuit for computing the weighted-addition coefficient Ratio1 shown in FIG. 13, and FIG. 15 shows a relation (input/output characteristic) between the weighted-addition coefficient Ratio1 and the angle determination signal.

The computing circuit shown in FIG. 14 includes an absolute value circuit (abs) 1301 that determines an absolute value of the angle determination signal acquired from the angle determination signal generation unit 103, and a CalRatio1 calculation circuit 1302 that has the input/output characteristic shown in FIG. 15 and that calculates the weighted-addition coefficient Ratio1 from the absolute value of the angle determination signal.

It should be noted that a calculation table or the like can be used instead of the CalRatio1 calculation circuit 1302.

Referring to FIG. 15, the weighted-addition coefficient Ratio1 having a value of 0 is output in a section where the angle determination signal has a small absolute value that varies from 0 to a threshold value Th11. In a section where the angle determination signal has an absolute value equal to or larger than a threshold value Th12, the weighted-addition coefficient Ratio1 having a value of 256 is output. In this example, a value of 256 represents 100%. In a section where the angle determination signal has an absolute value that varies from the threshold value Th11 to the threshold value Th12, the weighted-addition coefficient Ratio1 having a linearly interpolated value that varies from 0 to 256 is output.

Referring to FIG. 13 again, a multiplier 1216 of the SWY signal generation unit 102 multiplies the angle-adaptive SWY luminance signal SWY_ADPT by a weighted-addition coefficient 256-Ratio2. A multiplier 1215 multiplies the diagonal SWY signal SWY_D by a weighted-addition coefficient Ratio2. An adder 1217 adds outputs of the multipliers 1215, 1216 together, and outputs an addition result as an addition signal. A shifter 1218 shifts the addition signal, and outputs a shift result as an adaptive SWY luminance signal SWY.

The weighted-addition coefficients 256-Ratio2 and Ratio2 are generated according to chrome that is determined from the color difference signals R-G and B-G computed by the color difference signal generation unit 104 by taking account of influence of false color. As a result, the adaptive SWY luminance signal SWY is generated according to angle and chrome.

In other words, the SWY luminance signal SWY is computed according to the following formula (5).

$$SWY = SWY\_D \times Ratio2 + SWY\_ADPT \times 256\text{-}Ratio2 >> 8 \quad (5)$$

In the case of an achromatic object, the general-purpose SWY luminance signal SWY_HV is applied to HV Nyquist regions. As a result, the sharpness of the HV Nyquist regions in the achromatic object can be improved.

Figure 16:
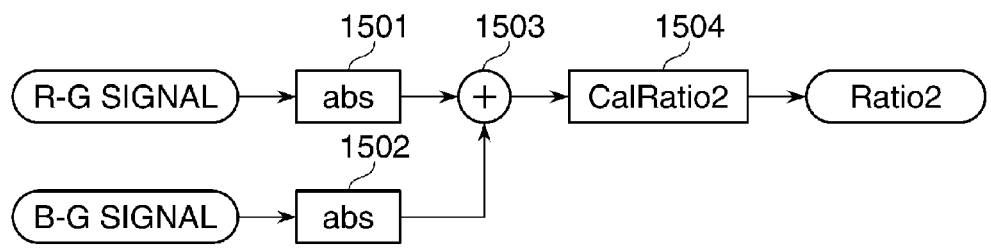
FIG. 16 is a block diagram showing an example construction of a computing circuit for computing a weighted-addition coefficient Ratio2 shown in FIG. 13.
Figure 17:
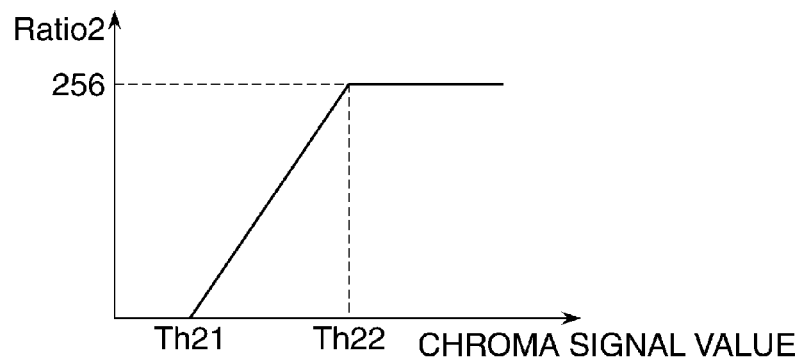
FIG. 17 is a view showing a relation between chroma signal and weighted-addition coefficient Ratio2.

FIG. 16 shows in block diagram an example construction of a computing circuit for computing the weighted-addition coefficient Ratio2 shown in FIG. 13, and FIG. 17 shows a relation (input/output characteristic) between weighted-addition coefficient Ratio2 and chroma signal.

The computing circuit shown in FIG. 16 includes absolute value circuits (abss) 1501, 1502 that respectively determine absolute values of the color difference signals R-G, B-G acquired from the color difference signal generation unit 104.

An adder 1503 adds the absolute value of the color difference signal R-G output from the absolute value circuit 1501 and the absolute value of the color difference signal B-G output from the absolute value circuit 1502, and outputs an addition result as a chroma signal.

The chroma signal is supplied to a CalRatio2 calculation circuit 1504 having the input/output characteristic shown in FIG. 17. According to the chroma signal, the CalRatio2 calculation circuit 1504 outputs a weighted-addition coefficient Ratio2. Instead of the CalRatio2 calculation circuit 1504, a calculation table or the like can be used.

Referring to FIG. 17, the weighted-addition coefficient Ratio2 having a value of 0 is output in a section where the chroma signal has a small absolute value that varies from 0 to a threshold value Th21 and that represents an achromatic object. In a section where the chroma signal has an absolute value that is equal to or larger than a threshold value Th22 and that represents a chromatic object, the weighted-addition coefficient Ratio2 having a value of 256 (=100%) is output. In a section where the chroma signal has an absolute value that varies from the threshold value Th21 to the threshold value Th22, the weighted-addition coefficient Ratio2 having a linearly interpolated value that varies from 0 to 256 is output.

It should be noted that maximum value filter processing can be applied to the chroma signal in order to expand a chroma determination region. The chroma signal can be normalized by brightness to detect a dark portion. In that case, the chroma is divided by luminance Y.

Referring to FIG. 1 again, the SWY signal SWY generated by the SWY signal generation unit 102 is supplied to the luminance signal mixing processing unit 106.

The luminance signal mixing processing unit 106 mixes the OG signal output from the OG signal generation unit 101 with the SWY signal output from the SWY signal generation unit 102, thereby generating a final luminance signal (i.e., a third luminance signal). At that time, the mixing processing unit 106 changes the ratio of mixing the SWY signal, as will be described later.

Figure 18:
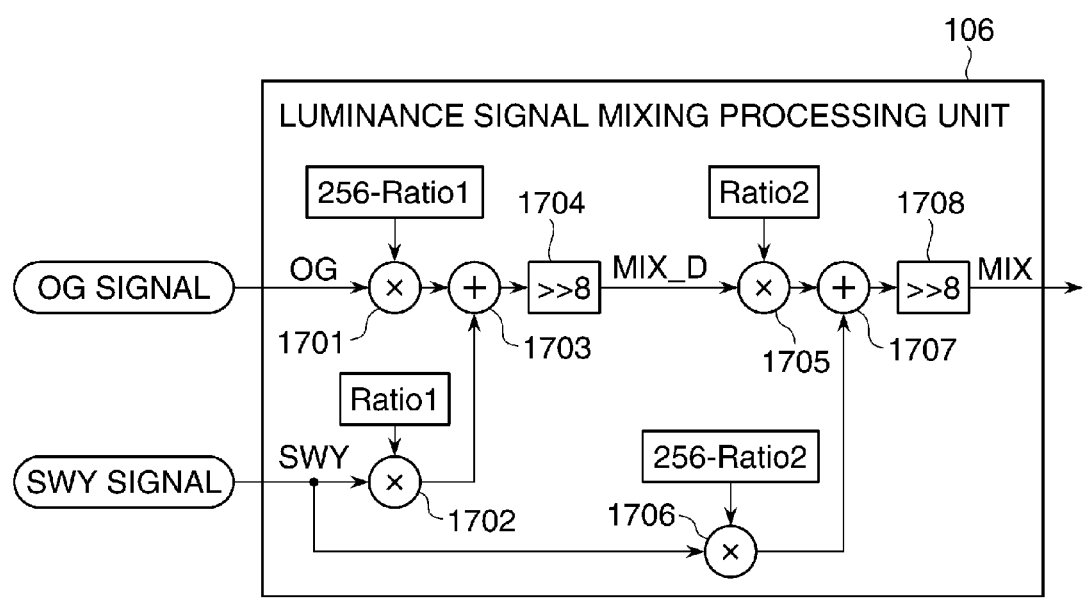
FIG. 18 is a block diagram showing an example construction of a luminance signal mixing processing unit shown in FIG. 1.

FIG. 18 shows in block diagram an example construction of the luminance signal mixing processing unit 106.

Referring to FIG. 18, the OG signal output from the OG signal generation unit 101 is supplied to a multiplier 1701. The multiplier 1701 multiplies the OG signal by the weighted-addition coefficient 256-Ratio1 generated based on the angle determination signal output from the angle determination signal generation unit 103.

The SWY signal SWY output from the SWY signal generation unit 102 is supplied to a multiplier 1702. The multiplier 1702 multiplies the SWY signal by the weighted-addition coefficient Ratio1 generated based on the angle determination signal output from the angle determination signal generation unit 103.

An adder 1703 adds outputs of the multipliers 1701, 1702 together, and outputs an addition result as an addition signal. A shifter 1704 shifts the addition signal, and outputs a shift result as a mixed luminance signal MIX_D.

In other words, the mixed luminance signal MIX_D is computed according to the following formula (6).

$$MIX\_D = OG \times 256\text{-Ratio1} + SWY \times Ratio1 >> 8 \quad (6)$$

Specifically, when the mixed luminance signal MIX_D is generated, the SWY signal is applied only to a diagonal region where the OG signal is affected by aliasing, while applying the OG signal to other regions. As a result, a high-frequency signal free from aliasing can be generated.

As previously described for the SWY signal generation unit 102 with reference to FIGS. 14 and 15, the weighted-addition coefficients 256-Ratio1 and Ratio1 are determined according to the angle determination signal output from the angle determination signal generation unit 103. The region to which the SWY signal is applied can be adjusted by adjusting the threshold values Th11, Th12.

A multiplier 1705 multiplies the mixed luminance signal MIX_D by the weighted-addition coefficient Ratio2, and a multiplier 1706 multiplies the SWY signal SWY by the weighted-addition coefficient 256-Ratio2. As previously described, the coefficient Ratio2 varies according to the chroma calculated based on the color difference signals R-G and B-G.

An adder 1707 adds outputs of the multipliers 1705, 1706 together, and outputs an addition result as an addition signal. A shifter 1708 shifts the addition signal, and outputs a shift result as a final luminance signal MIX.

In other words, the luminance signal MIX is computed according to the following formula (7).

$$MIX = MIX\_D \times Ratio2 + SWY \times 256\text{-Ratio2} >> 8 \quad (7)$$

The weighted-addition coefficient Ratio2 is determined by a computing circuit, which is the same as the Ratio1 computing circuit shown in FIG. 14, based on absolute values of the color difference signals R-G and B-G acquired from the color difference signal generation unit 104.

If the object is determined as being achromatic by formula (7) based on the chroma signal that takes account of the influence of false color, the SWY luminance signal SWY is used. If the object is determined as being chromatic, the SWY luminance signal SWY is applied to only a diagonal region, and the OG signal is used as the final luminance signal MIX for other regions.

As described above, with the first embodiment, the SWY signals are switched or weight-added according the chroma signal. For a region determined as being a Nyquist region, whether the object is achromatic or chromatic is determined based on the chroma signal that takes account of the influence of false color.

Even an achromatic object is sometimes determined as being a chromatic object at a Nyquist region due to the influence of false color. In that case, the OG signal is applied, so that aliasing occurs in the OG signal. In this embodiment, the SWY signal is applied to Nyquist regions to suppress luminance aliasing, whereby the sharpness of HV Nyquist regions can be improved in the case of an achromatic object.

Second Embodiment

Next, a description will be given of a luminance signal generation apparatus according to a second embodiment of this invention.

Figure 19:
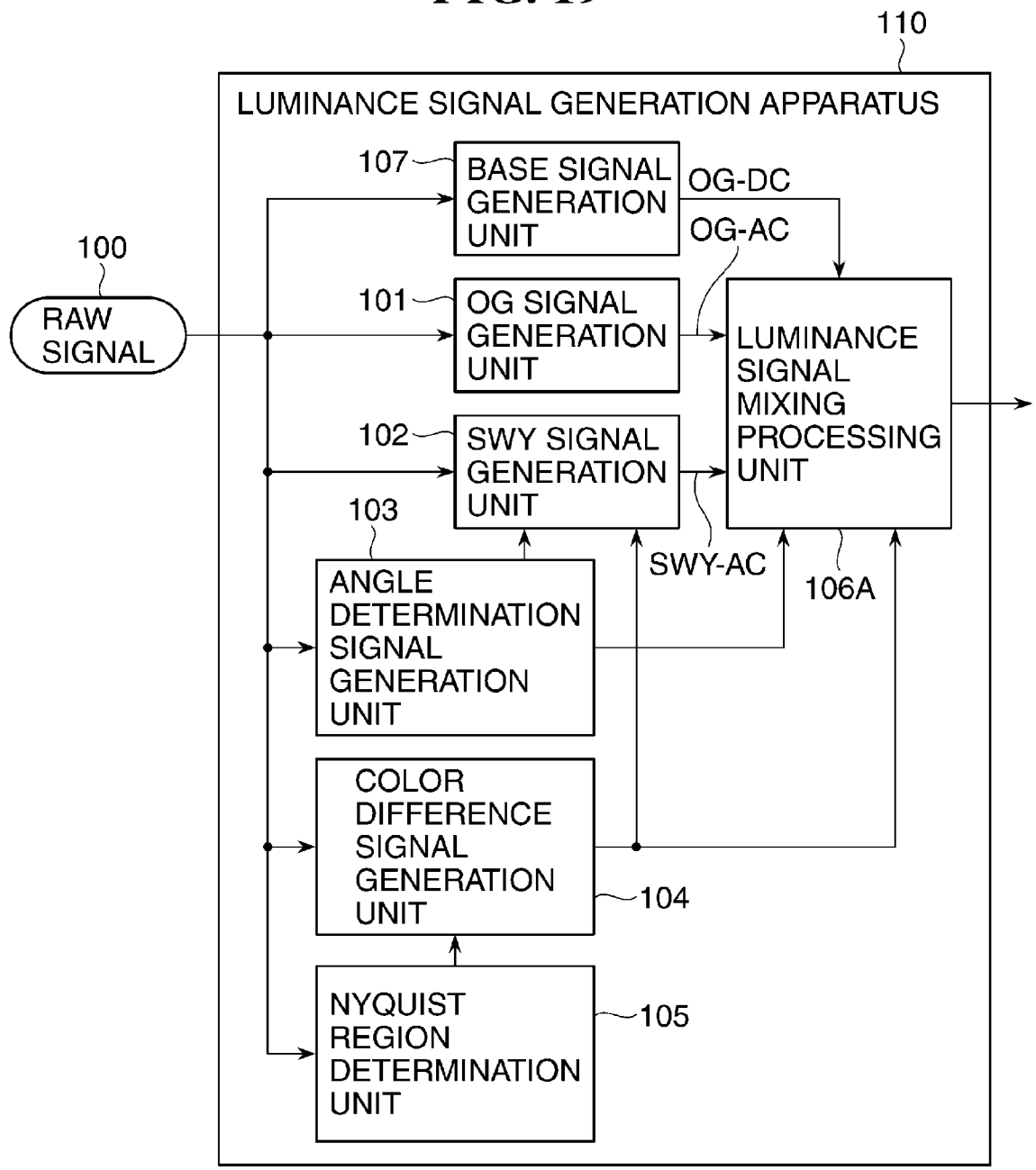
FIG. 19 is a block diagram showing an example construction of a luminance signal generation apparatus according to a second embodiment of this invention.

FIG. 19 shows in block diagram an example construction of the luminance signal generation apparatus 110 according to the second embodiment. In FIG. 19, like elements which are the same as or similar to those of the luminance signal generation apparatus 110 shown in FIG. 1 are denoted by like numerals, and a description thereof will be omitted.

Referring to FIG. 19, the luminance signal generation apparatus 110 includes a base signal generation unit 107. In FIG. 19, reference numeral 106A denotes a luminance signal mixing processing unit, which is different in construction from the luminance signal mixing processing unit 106 shown in FIG. 1.

In an image edge emphasis process, generally, an image edge component (a high-frequency component of image luminance signal) is extracted and added to an original image. To this end, each of the OG signal generation unit and the SWY signal generation unit usually includes a circuit (not shown) for adding a high-frequency emphasis signal to a base signal.

In the example shown in FIG. 19, the OG signal generation unit 101 and the SWY signal generation unit 102 generate a luminance signal. Then, a base luminance signal generated by the base signal generation unit 107 is added to the luminance signal, thereby obtaining a final luminance signal.

More specifically, the base signal generation unit 107 is supplied with the RAW signal 100 (image signal), and generates a signal from a low-frequency component of the image signal by using, e.g., the out-of-green method. At that time, a high-frequency emphasis signal generated from only a green signal is not added. The base signal generation unit 107 then subjects the signal generated from the low-frequency component of the image signal to LPF processing for limitation of bandwidth, thereby obtaining a base luminance signal OG_DC.

The OG signal generation unit 101 generates a signal only from a green signal of the RAW signal 100, and subjects the generated signal to BPF processing to generate a high-frequency emphasis signal, thereby obtaining an OG signal OG_AC.

The SWY signal generation unit 102 generates an SWY signal from the RAW signal 100 as previously described referring to FIG. 1. At that time, the SWY signal generation unit 102 performs BPF processing on the SWY_HV signal, SWY_45 signal, and SWY_135 signal which are shown in FIG. 13, and subjects other signals to processing similar to that of the first embodiment to generate a high-frequency emphasis signal, thereby obtaining an SWY signal SWY_AC (first high-frequency signal).

FIG. 20 shows in block diagram an example construction of the luminance signal mixing processing unit 106A. In FIG. 20, like elements which are the same as or similar to those of the luminance signal mixing processing unit 106 shown in FIG. 18 are denoted by like numerals.

Referring to FIG. 20, the high-frequency emphasis OG signal OG_AC output from the OG signal generation unit 101 and the high-frequency emphasis SWY signal SWY_AC output from the SWY signal generation unit 102 are mixed as described referring to FIG. 18, and the high-frequency emphasis luminance signal MIX (second high-frequency signal) is output from the shifter 1708.

The high-frequency emphasis luminance signal MIX and the base luminance signal OG_DC output from the base signal generation unit 107 are mixed together by the adder 2304, and a final luminance signal is output from the adder 2304.

As described above, with the second embodiment, not only advantages described in the first embodiment can be attained, but also luminance signals computed in different ways can be smoothly switched in a region where switching takes place between the luminance signals since the high-frequency emphasis luminance signals mixed in advance are added to the base luminance signal. As a result, it is possible to suppress occurrences of unnatural texture.

As apparent from the foregoing description, the OG signal generation unit 101 shown in FIG. 1 functions as a first luminance signal generation unit (this unit and the following units are defined in the appended claims), the SWY signal generation unit 102 functions as a second luminance signal generation unit, the Nyquist region determination unit 105 functions as a false color region detection unit, and the angle determination signal generation unit 103 functions as a direction determination unit. The selection circuit 320 shown in FIG. 3 functions as a first selection unit, and the luminance signal mixing processing unit 106 shown in FIG. 1 or the luminance signal mixing processing unit 106A shown in FIG. 19 functions as a mixing unit, and the LPFs 301 to 304 function as a hierarchical image generation unit.

Further, the V-LPF 1201, H-LPF 1202, D45-LPF 1203, D135-BPF 1204, D135-LPF 1206, and D45-BPF 1207 shown in FIG. 13 function as a first filter unit, the selector 1209 functions as a second selection unit, and the multipliers 1211, 1212, 1215, and 1216, the shifters 1214 and 1218, and the adder 1217 function as a generation unit.

Further, the D135-BPF 201 shown in FIG. 2 functions as a second filter unit, the D45-BPF 203 functions as a third filter unit, the calculation circuit shown in FIG. 16 functions as a chroma signal generation unit, and the base signal generation unit 107 shown in FIG. 19 functions as a base signal generation unit. The luminance signal mixing processing unit 106A shown in FIG. 19 functions as a mixer unit, and the adder 2304 shown in FIG. 20 functions as an adder unit.

Other Embodiments

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-158776, filed Jul. 13, 2010, which is hereby incorporated by reference herein in its entirety.

What is claimed is:

1. A luminance signal generation apparatus that generates a luminance signal according to an image signal constituted by color signals including a first color signal, comprising:
   a first luminance signal generation unit configured to generate a first luminance signal by interpolating the first color signal on pixels not corresponding to the first color signal;
   a second luminance signal generation unit configured to generate a second luminance signal by using the color signals as a raw luminance signal at pixel positions;
   a direction determination unit configured to determine a direction of an edge of the image signal and output an angle determination signal;
   a hierarchical image generation unit configured to generate, from the image signal, hierarchical image signals having different frequencies;
   a false color region detection unit configured to determine a false color region in each of the hierarchical image signals and output a false color region detection signal;
   a first selection unit configured to select one of the hierarchical image signals according to the false color region detection signal; and
   a mixing unit configured to mix the first and second luminance signals according to the angle determination signal and a chroma signal obtained from the selected one of the hierarchical image signals, thereby generating a third luminance signal.

2. The luminance signal generation apparatus according to claim 1, wherein said mixing unit increases a mixing ratio of the second luminance signal with decrease of the chroma signal.

3. The luminance signal generation apparatus according to claim 1, wherein said mixing unit increases a mixing ratio of the second luminance signal as the direction of the edge represented by the angle determination signal becomes closer to 45 or 135 degrees.

4. The luminance signal generation apparatus according to claim 3, wherein said direction determination unit includes a second filter unit that performs 135-degree direction band-pass filter processing on the image signal in a spatial frequency region to thereby obtain a first band-pass signal, and a third filter unit that performs 45-degree band-pass filter processing on the image signal in the spatial frequency region to thereby obtain a second band-pass signal, and
   the angle determination signal represents a 45-degree line region, if a result of subtraction of an absolute value of the first band-pass signal from an absolute value of the second band-pass signal is positive, and represents a 135-degree line region, if the result of the subtraction is negative.

5. The luminance signal generation apparatus according to claim 1, wherein said second luminance signal generation unit includes:
   a first filter unit configured to generate a fourth luminance signal by limiting a horizontal bandwidth, a vertical bandwidth, and a 45-degree direction bandwidth of the raw luminance signal, and configured to generate a fifth luminance signal by limiting the horizontal bandwidth, the vertical bandwidth, and a 135-degree direction bandwidth of the raw luminance signal;

a second selection unit configured to select one of the fourth and fifth luminance signals according to the angle determination signal and output the one of the fourth and fifth luminance signal as a selected luminance signal; and a generation unit configured to mix a sixth luminance signal, which is obtained by limiting the horizontal and vertical bandwidths of the raw luminance signal, with the selected luminance signal according to the chroma signal and the angle determination signal, thereby generating the second luminance signal.

6. The luminance signal generation apparatus according to claim 5, wherein said generation unit increases a mixing ratio of the selected luminance signal with increase of the chroma signal.

7. The luminance signal generation apparatus according to claim 5, wherein said generation unit increases a mixing ratio of the selected luminance signal as the direction of the edge represented by the angle determination signal becomes closer to 45 or 135 degrees.

8. The luminance signal generation apparatus according to claim 1, including:
   a color difference signal computing unit configured to compute color difference signals from the hierarchical image signals; and
   a chroma signal generation unit configured to generate the chroma signal from a color difference signal computed from the selected one of the hierarchical image signals.

9. The luminance signal generation apparatus according to claim 1, wherein the image signal constituted by the color signals are comprised of R, G1, G2, and B color signals of Bayer pattern, and
   said false color region detection unit interpolates the G1 color signal on pixels not corresponding to the G1 color signal to thereby generate a G1 image signal, interpolates the G2 color signal on pixels not corresponding to the G2 color signal to thereby generate a G2 image signal, and determines a false color region based on gradients of the G1 and G2 image signals.

10. The luminance signal generation apparatus according to claim 9, wherein said first selection unit selects an image signal having a highest frequency from among hierarchical image signals determined as not being included in a false color region by said false color region detection unit.

11. The luminance signal generation apparatus according to claim 1, including:

a base signal generation unit configured to perform low-pass filter processing on the image signal to thereby obtain a base luminance signal,
wherein said second luminance signal generation unit performs band-pass filter processing on the image signal to thereby generate a first high-frequency signal which is the second luminance signal, and
said mixing unit includes a mixer unit that mixes the first high-frequency signal with the first luminance signal to thereby obtain a second high-frequency signal, and an adder unit that adds the second high-frequency signal and the base luminance signal to thereby obtain the third luminance signal.

12. An image pickup apparatus comprising the luminance signal generation apparatus asset forth in claim 1, and configured to photograph an object to obtain the image signal.

13. A luminance signal generation method for generating a luminance signal according to an image signal constituted by color signals including a first color signal, comprising:
   a first luminance signal generation step of generating a first luminance signal by interpolating the first color signal on pixels not corresponding to the first color signal;
   a second luminance signal generation step of generating a second luminance signal by using the color signals as a raw luminance signal at pixel positions;
   a direction determination step of determining a direction of an edge of the image signal and outputting an angle determination signal;
   a hierarchical image generation step of generating, from the image signal, hierarchical image signals having different frequencies;
   a false color region detection step of determining a false color region in each of the hierarchical image signals and outputting a false color region detection signal;
   a selection step of selecting one of the hierarchical image signals according to the false color region detection signal; and
   a mixing step of mixing the first and second luminance signals according to the angle determination signal and a chroma signal obtained from the selected one of the hierarchical image signals, thereby generating a third luminance signal.

14. A non-transitory computer-readable storage medium storing a program for causing a computer to execute the luminance signal generation method as set forth in claim 13.

* * * * *